United States Patent [19]

Veser

[11] Patent Number: 4,683,650

[45] Date of Patent: Aug. 4, 1987

[54] DEVICE FOR THE INSTALLATION OF THE COILS INTO THE STATOR OF ELECTRICAL MACHINES

[76] Inventor: Franz Veser, Kanalstrasse 16, 7980 Ravensburg Bundesrepublik, Fed. Rep. of Germany

[21] Appl. No.: 792,557

[22] Filed: Oct. 29, 1985

[30] Foreign Application Priority Data

Oct. 31, 1984 [DE] Fed. Rep. of Germany ....... 3439769

[51] Int. Cl.$^4$ ............................................. H02K 15/06
[52] U.S. Cl. ........................................... 29/736; 29/596
[58] Field of Search .................. 29/596, 732, 734, 736

[56] References Cited

U.S. PATENT DOCUMENTS 4,217,938 8/1980 Barrett et al. ..................... 29/736 X
4,269,235 5/1981 Muskulus .......................... 29/736 X Primary Examiner—Carl E. Hall Attorney, Agent, or Firm—Spencer & Frank

[57] ABSTRACT

A device and a process for the functionally combined production, transfer and installation of coils (11a, 11b, 11c) into the stator (12) of electrical machines using installation strips (18a to 20b) provided with spreadable tongues. A ready-wound coil set (11a, 11b, 11c) is taken off the winding machine with its formers (4, 4a), moved to the stator (12), maintaining the spatial stepping and the flat shape of the coil phase windings, transferred directly from the formers (4, 4a) into the installation strips (18a to 20b) inserted into the stator (12), and drawn into the stator (12) as a whole in a single operation. One of the two formers (4) is provided with a preferably detachable support element (13) which lifts the coil heads out of the former chambers by turning the former about the axis of its carrying rod (3). For easier introduction of the coil phase windings into the installation strips (18a to 20b), their strip tongues are arranged in different lengths and stepped.

8 Claims, 11 Drawing Figures

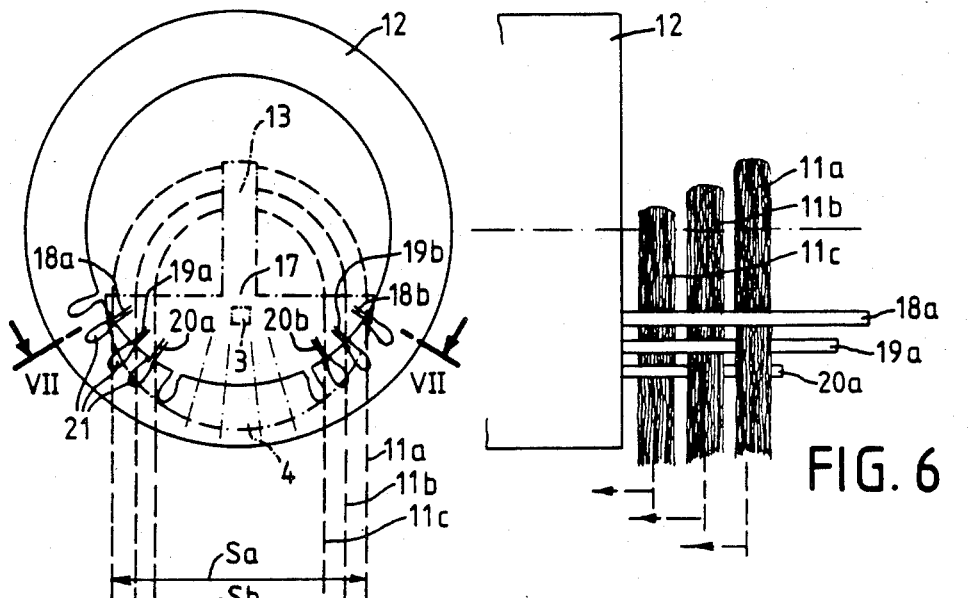
FIG. 5
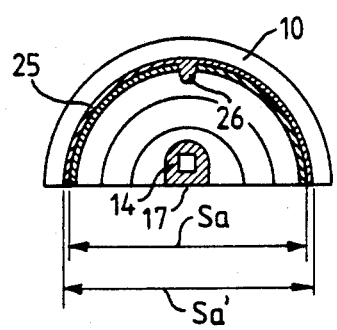
FIG. 8
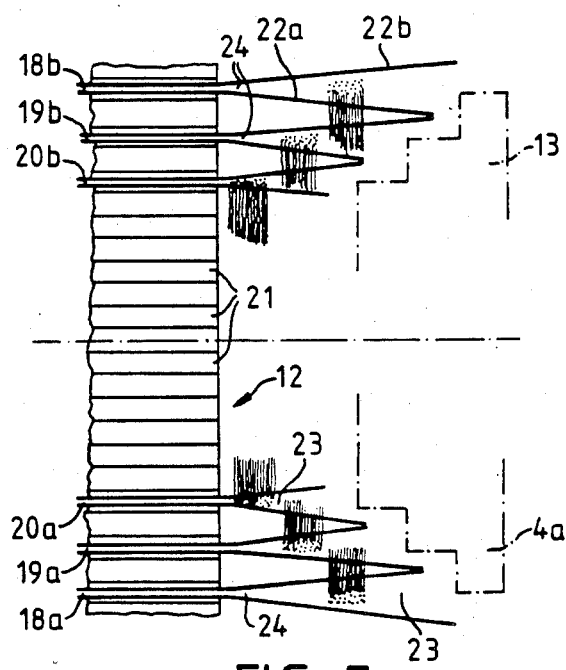
FIG. 6
FIG. 7

DEVICE FOR THE INSTALLATION OF THE COILS INTO THE STATOR OF ELECTRICAL MACHINES

BACKGROUND OF THE INVENTION

The invention relates to a device and a process for the production, transfer and installation of the coils into the stator of electrical machines, the interconnected coils being machine-fabricated in sets by means of semi-circular winding formers with wire chambers stepped in correct polarity and the formers being arranged axially extractably on carrying bars which are secured parallel to the rotational axis on rotary arms of a winding machine such that they allow themselves to be turned after release of a rotational lock, furthermore the winding diameters of the formers being equivalent to the cord lengths between the corresponding stator grooves, and the coil sets taken off the formers being installed into the stator by means of elastically spreadable installation strips inserted in groups between the groove heads.

In electrical machine construction, the working steps named and the means used for them are essentially dealt with as separate technologies. The result of this is that the production objective, namely fitting of the stator with wire coils, is only achieved at a high expenditure in terms of time and labor. Particular problems are presented by transportation of the wound coils to the stator without them losing their original shape. Usually, time-consuming secondary jobs and additional devices are necessary to prepare the densely wound coils such that they can be laid satisfactorily into the narrow stator grooves.

SUMMARY OF THE INVENTION

It is therefore the objective of the invention to facilitate stator fitting. The preparatory working steps are to be executed in such a way that installation of the coils is facilitated with the aid of known, tried-and-tested so-called installation strips and thus the time expenditure from winding the coil to concluding the installation operation can be reduced.

Another objective consists in being able to take the coils off the winding formers with a few manipulations, i.e. simplifying the adjustment facilities of the formers.

The exposed loose coils are to retain their shape so that the wire layers do not have to be ordered and the coil phase windings do not have to be fixed by binding with tapes or the like. In particular the invention endeavors to create flat coil phase windings which can be inserted particularly well into the installation strips.

Another objective is the production of multi-phase coil sets ordered in correct polarity which are connected to one another during the course of the winding operation by looped-over winding wires without separation points and the joint installation of these coil sets into the stator.

The invention intends in particular to increase the overall performance of small winding shops and repair workshops for electrical machines and achieve the same or a higher product quality without great financial investments and with less trained workers.

Starting out from a device of the type designated in the introduction, these objectives are achieved according to the invention by the fact that, for dimensionally stable transfer of the coil set from the winding machine to the stator, at least one of the two mutually opposite former sets is provided with a support element which, running radially in the former mid-axis and perpendicular to the former sectional plane, protrudes into the former-free space and the supporting faces of which are designed in mirror symmetry with the step profile of the former set, the step radii of the support element being equivalent to the winding radii of the former chambers and the supporting faces being arcs concentric to the winding axis of about 10° arc length. The turning of such a former set through 180° alone is enough to move the ready-wound coils into a receive-ready position. The coils are transported without dimensional loss together with the former sets and inserted into the installation strips. Only then are the former sets removed.

In this way, not only is the manual work of the winder simplified and speeded up, but the possibility of mechanizing the said operations in the series production of electrical machines is also created.

Further expedient structural details are described below. Brief reference is to be made here to the most important ones. The raised holding edge prevents slipping off of the coils from the supporting faces of the support element. The former sets may be designed variably with respect to the winding radii, for example by means of slip-on semi-circular insertion dishes. Of particular significance are arrangements according to which the former set can be separated from the support element, facilitating the insertion of the coil phase windings into the installation strips. With the aid of a second carrying rod, such a support element can be extracted together with the former set more easily from the former carrying rod.

The working process according to the invention has two variants which differ from each other according to whether the support element is secured to the associated former set or is separable from it. In one case, the former set is turned as long as it is still on the former carrying rod. In the other case, on the other hand, the turning movement is performed when both former sets have been extracted from the winding machine, the second carrying rod serving as a turning axis.

Finally, the invention proposes a particular installation strip group which is distinguished by the fact that the individual installation strips and, in particular, their individual tongues are of different lengths. The tongue ends are preferably spread such that they touch one another and thereby produce receiving spaces which facilitate the introduction of the coil phase windings. A further facilitation and simplification of work in this respect is achieved by the fact that in each case two installation strips assigned to a coil are marked by their own coloring.

BRIEF DESCRIPTION OF THE DRAWING

Details of the device according to the invention are diagrammatically represented as exemplary embodiments in the drawings, in which

FIG. 5 shows the front view of the stator with fitted coils for a four-pole winding pitch with 36 grooves;

FIG. 6 shows a side view of FIG. 5;

FIG. 7 shows an enlarged plan view of the stator cross-section along line VII—VII of FIG. 5, elongated in the horizontal plane, with diagrammatically drawn-in installation strips, coils and support elements;

FIG. 8 shows the cross-section through a former chamber with insertion dish;

DESCRIPTION OF THE PREFERRED EMBODIMENTS

Figure 1:
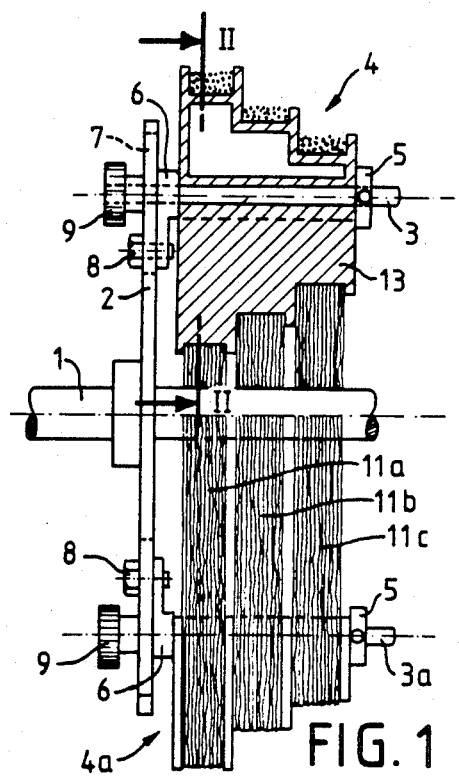
FIG. 1 shows a side view of the former sets with the coils, partially in cross-section along line I—I of FIG. 2.

With reference to FIGS. 1-4 the drive shaft 1 of the winding machine has secured thereon in the usual way a rotary arm 2 on which the carrying rods 3, 3a for the winding former sets 4, 4a are attached. The latter are connected to be rotationally fixed to, but axially extractable from, their carrying rods and the axial displacement can be blocked by setting rings 5. The carrying rods 3, 3a are secured on the rotary arm 2 via one spacer 6 each which can be radially adjusted in a longitudinal groove 7 by actuation of a fixing screw 8 on the rotary arm 2. In addition, provided on the inner end of the carrying rod 3, 3a is a tightening screw 9 with which the rotatability of the carrying rod and of the former set can be arrested and released as required.

The wire coils 11a, 11b, 11c wound in the former chambers 10 are interconnected in correct polarity in a known way by wire connections so that they can be handled from here on as a unit and installed in the stator 12 (FIGS. 5, 6, 7). The former chambers 10 are widely shaped and the winding operation is controlled such that the coil phase windings are given a flat cross-section. This preparatory measure facilitates the following installation of the coils into the narrow stator grooves and the use of the known installation strips.

The former set 4 is provided with a support element 13 which is secured on the continuous former hub 14, or can be made integral with the latter, and which, extending perpendicular to the former sectional plane, projects into the former-free space. The supporting faces 16a, 16b, 16c of the support element, provided on both sides with raised holding edges 15, are designed mirror-symmetrically to the opposite former set 4, the winding radii also coinciding. The former hub 14 receiving the carrying rod 3 is arranged in the present example such that the axis of the carrying rod 3 runs at a short distance from the geometrical form axis 17 of the half-former.

The winding facility is shown in an operational state with ready-wound coil set. In order to implement then the intended transfer of the coils to the stator 12 such that the three-dimensional shape of the coil set and the flat coil cross-section are retained as exactly as possible, first of all the rotary arm 2 is swung far enough for the former set 4 to be in the upper vertex position shown. Then the rotational lock of the carrying rod 3 is lifted by release of the tightening screw 9, whereupon the carrying rod with the former set 4 and the support element 13 is turned through 180° and moved into the position according to FIGS. 3 and 4, the spacer 6 acting as a bearing for the carrying rod 3. This turning causes only the semi-circular coil heads to be released, whereas the vertical coil phase windings continue as before to be guided dimensionally stably in their former chambers 10 and are now suspended on the supporting faces 16a, 16b, 16c of the support element 13 so that the inherently rigid coil form is retained.

The finished coil sets can now be brought into the installation strips 18a, 19a, 20a (FIG. 6) for installation without the risk of deformation. For this purpose, the setting rings 5 are released so that the former sets 4, 4a can be axially detached simultaneously from their supporting rods 3, 3a and subsequently the entire former-coil complex is transportable. In this condition, the upper coil heads are securely suspended on the support element 13 by the weight of the coil whereas the vertical coil phase windings are positively held in the former chambers 10 of the upper former set 4 and of the lower former set 4a.

FIGS. 5, 6 and 7 show the arrangement of the installation strips 18a, 18b, 19a, 19b, 20a, 20b, the stator 12 being turned in its receiving bearing such that the groove group to be fitted is located in the lower vertex region symmetrical to the vertical mid-axis. As a preparatory step, the installation strips are inserted into the grooves 21 of the stator such that their head parts, consisting of the spread tongues 22a, 22b, protrude out of the stator grooves. In accordance with the three-dimensional shape of the stepped coil set, the lengths of the spread strip head parts are likewise stepped.

This produces an effective optical indication for the logical, quick matching of the strips with the variously lying coils of different sizes. As a further aid for reliable introduction between the spread tongues of the individual installation strips, each interacting strip pair is marked or colored by its own coloring, e.g. strips 18a, 18b red, strips 19a, 19b green and strips 20a, 20b blue. In addition, the angle of spread of the strip tongues is chosen such that the tongues of two neighboring strips can make a tangent to each other, so that the inadvertent pushing-in of a coil phase winding between two strips is avoided and completely accurate, reliable lining up of the entire coil set with the strips can be carried out in a short time.

According to FIGS. 5, 6, and 7, in this process the coil set suspended on the support element 13 is transferred directly into the spaces 23 of the spread head pieces of the installation strips 18, 19, 20 (a/b), so that the coils are now carried by these head pieces. This causes the upper former set 4 with the support body 13 to be relieved and it can be taken out of the coil set together with the lower former set 4a. Subsequently, the coils 11a, 11b, 11c are pushed in the direction of the arrows of FIG. 6 right up to the stator or far enough for them to reach the clamping region 24 of the installation strips.

The subsequent installation of the complete coil set into the stator can be performed in a known way, e.g. by the installation strips connected to a draw device being drawn axially through the stator bore and in the process drawing the coil phase windings into the grooves 21. The spreading spaces 23 of the installation strips, shown in FIG. 7, also facilitate attachment of the cover slides which can be installed by pushing over the coil phase windings.

After completion of the described groove fitting, the stator 12 is turned on further by the pole pitch, in the present example through 90°, until the groove group to be fitted is again located in the lower vertex position according to FIG. 5.

The dimensions of the groove graduated circle and of the graduation module determine the dimensions of the coil sets to be wound, in particular the cord lengths Sa, Sb, Sc. However, repair shops also receive stators on which the said cord lengths and the profiles of the coil chambers deviate from standard dimensions, so that a reprocessing of the wound coils or the procurement of special winding formers is necessary. As the deviations are usually only slight, the effort mentioned can be avoided by the formers in each case being adapted to the deviant cord length, e.g. Sa', in accordance with FIG. 8 by introducing one or more insertion dish 25, it being expedient to use a former set with the next smallest dimensions. The insertion dish 25 can be detachably connected to the basic former, for example by a plug cone 26.

Figure 9:
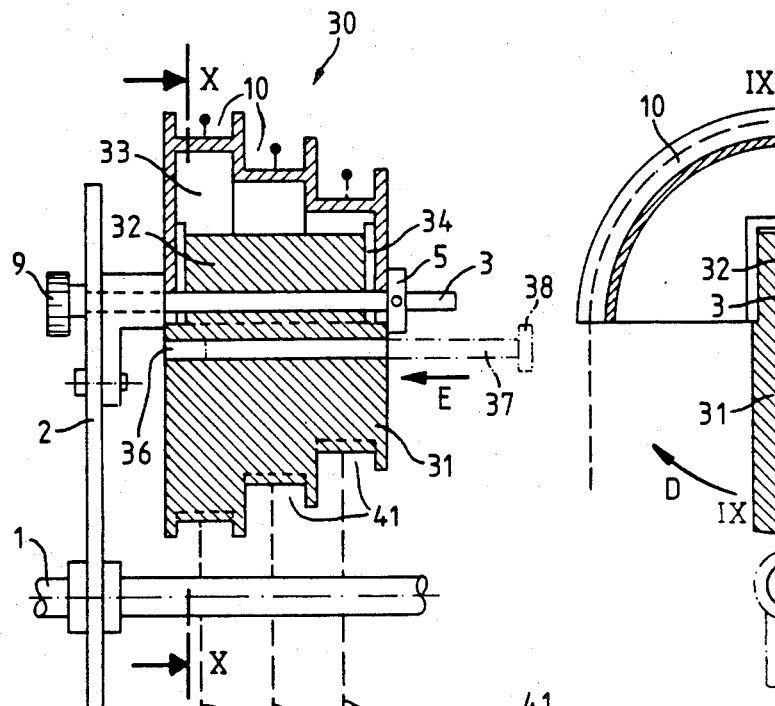
FIG. 9 shows a side view of another former set with the coils, taken in cross-section along line IX—IX of FIG. 10.
Figure 10:
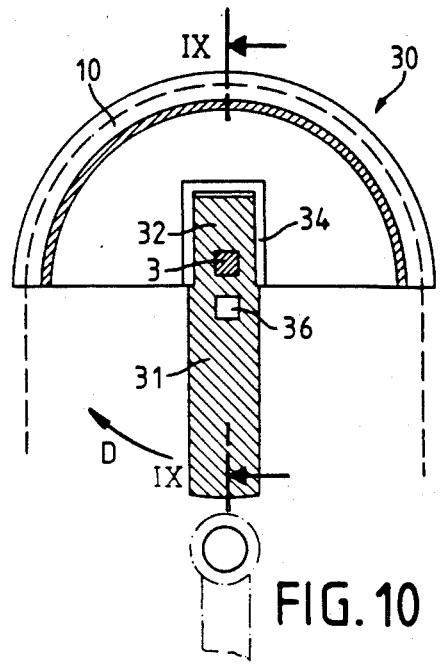
FIG. 10 shows the front view of FIG. 9, taken in cross-section along line X—X of FIG. 9.
Figure 11:
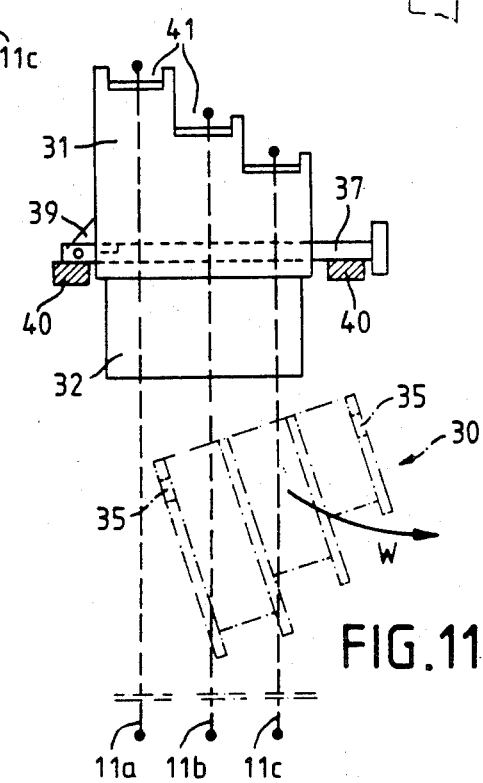
FIG. 11 shows a side view of the support element separated from the former set in accordance with FIG. 9.

In FIGS. 9 to 11, a further exemplary embodiment of a former set with support element is illustrated, which is particularly advantageous for multi-wired tiered windings. Parts coinciding with the first exemplary embodiment bear the same reference numbers.

Figure 2:
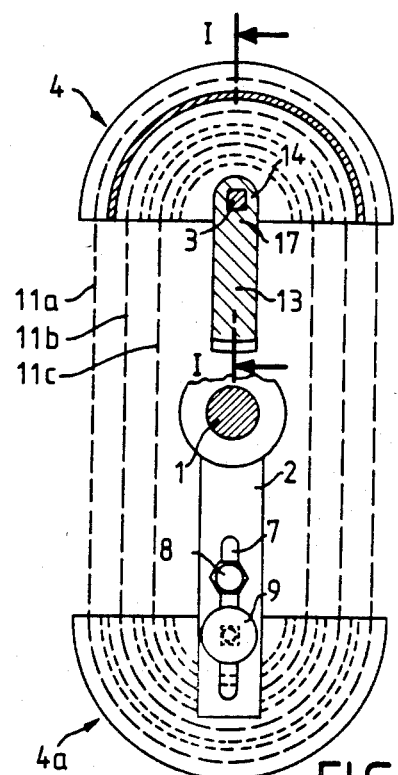
FIG. 2 shows the front view of FIG. 1 taken in cross-section along II—II of FIG. 1.
Figure 3:
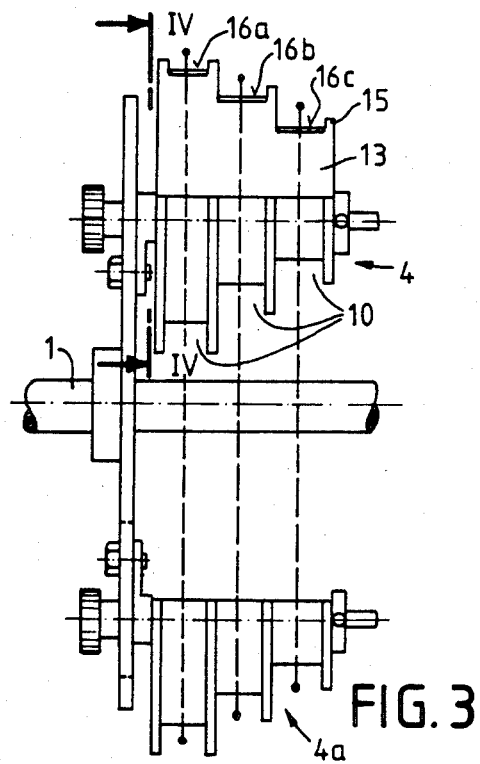
FIG. 3 shows a side view of the former sets with the coils in the vertex position of the support element.
Figure 4:
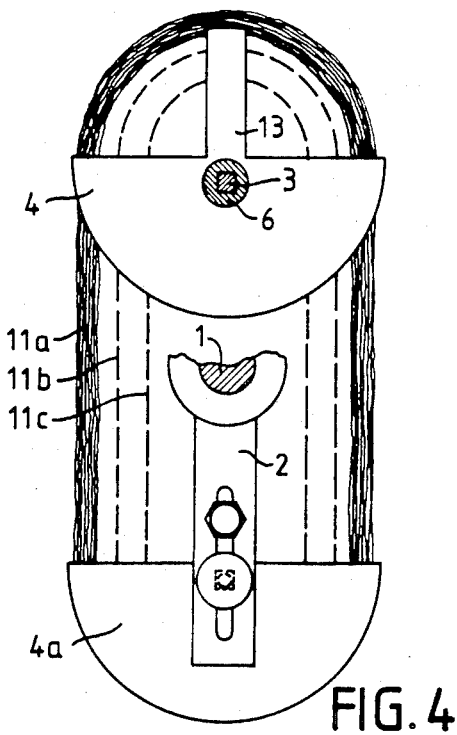
FIG. 4 shows the front view of FIG. 3 in cross-section along line IV—IV of FIG. 3.

FIGS. 9 and 10 show in a similar way to FIGS. 1 and 2 a former set 30 which is pushed onto the carrying rod 3 which is secured on the rotary arm 2 of the winding machine by the tightening screw 9. At the other end, the former set is axially secured by a setting ring 5.

The winding operation is concluded and the wire coils 11a, 11b and 11c lie flat in the former chambers 10. The coil set is moved into its upper vertex position, the downwardly suspended coil phase windings being guided through the wire chambers of the lower former set (not shown).

The support element 31 is an independent element, separated from the former set, and is provided with a receiver 32 which projects into the hollow interior space 33 of the formers where it is held positively, but detachably. This is achieved, for example, by two elastic guide strips 34 attached in the former, through which the receiver can be pushed in, producing a retaining tension which is sufficient to carry the support element 31.

The receiver 32 has a longitudinal bore which, with fitted receiver, aligns with the bores 35 in the outer walls of the former set, so that the carrying rod 3 inserted into the bores connects the former set 30 and the receiver 32 to the rotary arm 2.

Underneath the former longitudinal axis, the support element 31 is provided with a second profiled receiving bore 36 which serves for rotationally positive reception of a second carrying rod 37, which can be provided at one end with a retaining knob 38 and has at its inserting-side end a driving bolt 39 which is moved automatically into a transverse position and facilitates the extraction of the former set from the bearing rod 3, which remains on the rotary arm 2.

Before this extraction operation, the second bearing rod 37 has been pushed into the second receiving bore 36 (arrow E), so that this rod now carries the former set with the coils and the support element.

In this state, to facilitate further handling, the carrying rod 37 can be set down onto two bearing rails 40 (FIG. 11).

Subsequently, the support element 31 with its receiver 32 and the former set 30 is swung through 180° about the axis of the carrying rod 37 (arrow D) so that now, as shown in FIG. 11, the former set 30 assumes the lower vertex position and the support element 31 the upper vertex position, the wire coils 11a, 11b, 11c being lifted out automatically from the former chambers 10 of the formers and taken over by the wire chambers 41 of the support element 31. The former set 30 can now be detached from the receiver 32 and taken out of the region of the coil phase windings (arrow W, FIG. 11).

Once the other former set suspended at the bottom in the coil phase windings has been cleared away as well, the unhindered insertion of the coil phase windings into the installation strips already arranged in the stator can be carried out, the support element ensuring the three-dimensional shape and flat position of the coils.

I claim:

1. In a device for the production, transfer and installation of interconnected coils into the stator of an electrical machine, the interconnected coils being machine-fabricated in sets by means of semi-circular winding formers with wire chambers stepped in correct polarity and the formers being arranged axially extractably on carrying bars which are secured parallel to the rotational axis on rotary arms of a winding machine such that the formers can be turned after release of a rotational lock, with the winding diameters of the formers being equivalent to the chord lengths between the corresponding stator grooves, and the coil sets taken off the formers being installed into the stator by means of elastically spreadable installation strips inserted in groups between the groove heads, the improvement wherein said formers comprise two mutually opposite former sets, each having a mid-axis, a sectional plane and a step profile, with a former-free space being provided adjacent each former set, and said device further comprises a support element associated with at least one said former set for dimensionally stable transfer of a coil set from the winding machine to the stator, said support element extending radially in the mid-axis of said one former set and perpendicular to the sectional plane of said one former set and protruding into the former-free space adjacent said one former set, said support element having supporting faces which are in mirror symmetry with the step profile of said one former set and having step radii which are equivalent to the radii of the wire chambers of said one former set, and said supporting faces being arcs concentric to the axis of the coil windings and having arc lengths of about 10°.

2. A device as claimed in claim 1, wherein the supporting faces are provided on either side with a raised holding edge (15), the height of which is approximately equivalent to the thickness of the coil phase winding.

3. A device as claimed in claim 2, wherein, for adaptation of the winding radii to the said one chord lengths (Sa, Sb, Sc) between the corresponding stator grooves (21), the former set is adjustably designed.

4. A device as claimed in claim 3, further comprising a semi-circular insertion dish (25), the inside radius of which is adapted to the radius of one wire chamber and which can be inserted into the one wire chamber (10) and can be connected positively, but exchangeably, to the latter.

5. A device as claimed in claim 4, wherein the insertion dish (25) forms a coil chamber provided with chamber walls to establish the width of the coil phase winding.

6. A device as claimed in claim 1, wherein the support element (31) is provided with a receiver (32) which runs parallel to the central longitudinal axis of the one former set (30), can be inserted into the body of the one former set and has a first receiving bore for the former carrying bar (3), and wherein the support element is provided outside the former set with a second receiving bore (36) which, in relation to the former mid-plane, is arranged symmetrically to the first receiving bore and is aligned for the positive reception of a second carrying rod (37).

7. A device as claimed in claim 6, wherein the receiver (32) is connected positively, but detachably, to the one former set (30).

8. A device as claimed in claim 6, wherein the second carrying rod (37) is provided at its inserting-side end with a driving bolt (39) which is moved automatically into a transverse position in the inside final position of the carrying bar.

* * * * *